(12) United States Patent
Chen et al.

(10) Patent No.: US 10,983,243 B2
(45) Date of Patent: Apr. 20, 2021

(54) HUMAN BODY SECURITY INSPECTION APPARATUS AND METHOD OF OPERATING THE SAME AND FILTER DEVICE

(71) Applicants: Tsinghua University, Beijing (CN); NUCTECH COMPANY LIMITED, Beijing (CN)

(72) Inventors: Zhiqiang Chen, Beijing (CN); Yuanjing Li, Beijing (CN); Ziran Zhao, Beijing (CN); Wanlong Wu, Beijing (CN); Ming Ruan, Beijing (CN); Yingkang Jin, Beijing (CN); Guangwei Ding, Beijing (CN); Zongjun Shen, Beijing (CN); Jiajiang Zhao, Beijing (CN)

(73) Assignees: TSINGHUA UNIVERSITY, Beijing (CN); NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 16/491,891

(22) PCT Filed: Dec. 20, 2017

(86) PCT No.: PCT/CN2017/117498
§ 371 (c)(1),
(2) Date: Sep. 6, 2019

(87) PCT Pub. No.: WO2018/161680
PCT Pub. Date: Sep. 13, 2018

(65) Prior Publication Data
US 2020/0012010 A1 Jan. 9, 2020

(30) Foreign Application Priority Data
Mar. 7, 2017 (CN) .......................... 201710133118.5

(51) Int. Cl.
*G01V 5/00* (2006.01)
*G21K 1/10* (2006.01)
*G01N 23/203* (2006.01)

(52) U.S. Cl.
CPC ......... *G01V 5/0025* (2013.01); *G01N 23/203* (2013.01); *G21K 1/10* (2013.01);
(Continued)

(58) Field of Classification Search
None
See application file for complete search history.

(56) References Cited

U.S. PATENT DOCUMENTS 4,277,685 A * 7/1981 Covic .................... G03B 42/02
378/150
4,399,550 A * 8/1983 Hauck ..................... A61B 6/06
378/157

(Continued)

FOREIGN PATENT DOCUMENTS

CN 201488958 U 5/2010
CN 102595754 A 7/2012
(Continued)

OTHER PUBLICATIONS

Russian Office Action issued in corresponding Russian Patent Application No. 2019130864, dated Jan. 30, 2020.
(Continued)

*Primary Examiner* — Thomas R Artman
(74) *Attorney, Agent, or Firm* — Pillsbury Winthrop Shaw Pittman LLP

(57) ABSTRACT

A human body security inspection apparatus, a method of operating the same, and an associated filter device are disclosed. The human body security inspection apparatus includes a radiation beam exit configured for emitting a radiation beam; a beam guiding box configured for guiding
(Continued)

the radiation beam; and a filter device configured between the radiation beam exit and the beam guiding box. The filter device includes a housing and a filter cage having a central axis. The filter cage is formed by arranging two or more pairs of filtering sheets, which are made of different materials and/or have different thicknesses, in an encircling way. The filter cage is rotatable about its central axis such that at least one pair of filtering sheets is capable of filtering the radiation beam to adjust an outputted dosage of the radiation beam of the human body security inspection apparatus.

20 Claims, 3 Drawing Sheets

(52) U.S. Cl.
CPC ............ *G01N 2223/053* (2013.01); *G01N 2223/1016* (2013.01); *G01N 2223/313* (2013.01); *G01N 2223/316* (2013.01); *G01N 2223/32* (2013.01); *G01N 2223/3303* (2013.01); *G01N 2223/405* (2013.01); *G01V 5/0066* (2013.01)

(56) References Cited

U.S. PATENT DOCUMENTS

| | | | | |
|---|---|---|---|---|
| 5,600,700 A * | 2/1997 | Krug | ............... | G01V 5/0041 378/57 |
| 5,838,765 A * | 11/1998 | Gershman | ............ | A61B 6/06 378/196 |
| 6,973,158 B2 | 12/2005 | Besson | | |
| 7,330,535 B2 * | 2/2008 | Arenson | ............ | G21K 1/04 378/156 |
| 7,336,769 B2 * | 2/2008 | Arenson | ............ | G21K 1/04 378/159 |
| 7,706,508 B2 * | 4/2010 | Arenson | ............ | G21K 1/04 378/158 |
| 8,199,883 B2 * | 6/2012 | Arenson | ............ | G21K 1/04 378/158 |
| 9,008,264 B2 * | 4/2015 | Boone | ............ | G01N 23/04 378/51 |
| 9,420,676 B2 | 8/2016 | Chen et al. | | |
| 2003/0224182 A1 | 12/2003 | Simpson et al. | | |
| 2007/0104320 A1 * | 5/2007 | Arenson | ............ | G21K 1/043 378/145 |
| 2007/0116181 A1 * | 5/2007 | Arenson | ............ | G21K 1/04 378/156 |
| 2008/0043924 A1 * | 2/2008 | Arenson | ............ | G21K 1/043 378/156 |
| 2010/0195802 A1 * | 8/2010 | Arenson | ............ | G21K 1/04 378/158 |
| 2013/0016808 A1 * | 1/2013 | Boone | ............ | A61B 6/583 378/51 |
| 2019/0187324 A1 * | 6/2019 | Vienne | ............ | G01V 5/0066 |

FOREIGN PATENT DOCUMENTS

| | | |
|---|---|---|
| CN | 106814404 A | 6/2017 |
| CN | 206515264 U | 9/2017 |
| RU | 147765 | 11/2014 |
| WO | WO 00/43760 A2 | 7/2000 |

OTHER PUBLICATIONS

International Search Report as issued in International Patent Application No. PCT/CN2017/117498, dated Mar. 19, 2018.

\* cited by examiner

HUMAN BODY SECURITY INSPECTION APPARATUS AND METHOD OF OPERATING THE SAME AND FILTER DEVICE

CROSS-REFERENCE TO RELATED APPLICATION

This application is the U.S. national phase entry of PCT Patent Application No. PCT/CN2017/117498, filed on Dec. 20, 2017, which claims the benefit of priority of Chinese Patent Application No. 201710133118.5, filed with the State Intellectual Property Office of China on Mar. 7, 2017, the whole disclosure of which is incorporated herein by reference.

TECHNICAL FIELD

Embodiments of the present disclosure mainly relate to the field of human body security inspection with an X-ray source, and more particularly to a filter device, a human body security inspection apparatus including the filter device, and a human body security inspection method. In addition, the present disclosure can also be used in the field of human medical radiation therapy.

DESCRIPTION OF RELATED ART

Currently, techniques for performing human body security inspection using X-ray equipment are mainly divided into two types based on different principles: a transmission imaging technology and a backscatter imaging technology. The X-ray transmission imaging technology refers to implementing X-rays to pass through a human body to be inspected, and analyzing the X-ray signal passing through the human body to obtain a human body transmission image. The X-ray transmission imaging technology is the main technical approach for checking for a hidden object in the human body and the body surface. The X-ray backscattering technology is directed to using a micro-X-ray source to scan a person to be inspected and receiving a radiation signal scattered back from the human body surface to obtain a contour image of the human body surface and an object. The X-ray backscattering technology is effective to detect dangerous goods carried by the human body.

In fact, the human body, when exposed to X-rays, will be subject to ionizing radiation damage. Thus, there is a strict set of dosage limits for different radiation protection systems. In order to reduce unnecessary radiation damage to the human body while achieving the purpose of human body security inspection, the existing human body X-ray security inspection equipment generally has several outputting-dosage levels, and adjustment among the several outputting-dosage levels is realized by adjusting voltage and current parameters of the X-ray machine. When a common or general security inspection is performed, a person or crowd will be subject to inspection with a low-dosage or micro-dosage radiation beam. In unconventional cases such as a situation where suspected objects or key locations are inspected or a critical period, a security inspection is performed with a high-dosage radiation so as to obtain a clearer image, thereby achieving more reliable recognition and a faster inspection. However, in practice, the difference between a high dosage and a low dosage of outputting radiation is limited. Moreover, during performing an inspection of a human body, the existing X-ray human body security inspection apparatuses generally perform only an overall scan of the whole human body or only a partial scan of a fixed body section or location of the human body, but is not flexible to realize scanning and security inspection of any section of the human body. Further, it is impossible for the existing X-ray human body security inspection apparatuses to protect the remainder section of the human body that is not inspected from the radiation to reduce radiation damage when performing a local scan of the human body.

However, the purpose and object of security inspections are different, and the attention and requirements for security inspections of different sections of the human body are also different. Therefore, in practice, it is one of the main topics of industry today, and an objective, to achieve a human body security inspection apparatus that can adjust a scan region and achieve a suitable outputting dosage level in time as required so as to perform a security inspection of any section of a human body while ensuring reducing unnecessary radiation damage.

SUMMARY

Based on the above, the present disclosure aims to overcome or alleviate at least one or more of the technical problems that exist in the prior art described above.

According to an aspect of the present disclosure, there is provided a human body security inspection apparatus including:
 a radiation source having a radiation beam exit and configured for emitting a radiation beam; and
 a beam guiding box for guiding the radiation beam emitted from the radiation source;
 the human body security inspection apparatus further includes:
 a filter device disposed between the radiation beam exit of the radiation source and the beam guiding box, the filter device comprising:
 a housing; and
 a filter cage disposed within the housing and formed by arranging two or more pairs of filtering sheets, which are made of different materials and/or have different thicknesses, in an encircling way;
 wherein the filter cage is capable of rotating about its central axis such that at least one pair of the two or more pairs of filtering sheets is capable of filtering the radiation beam from the radiation beam exit of the radiation source to adjust an outputted dosage of the radiation beam of the human body security inspection apparatus In some embodiments, the human body security inspection apparatus may further include: a pair of filter region defining rods, the pair of filter region defining rods being respectively disposed at opposite ends of the filter cage along the central axis and being configured to be capable of moving in a direction, in which the central axis of the filter cage extends, to define a filter region, between the pair of filter region defining rods, of the at least one pair of the two or more pairs of filtering sheets, thereby defining a scan range of the radiation beam. Herein, movement of the pair of filter region defining rods may be driven by a stepping motor.

In some embodiments, the material and diameter of the pair of filter region defining rods are configured to be sufficient to shield and block the radiation beam emitted by the radiation source.

In some embodiments, the human body security inspection apparatus may further include: an input unit configured to transmit, in a manner of manipulating a rod identifier representative of the pair of filter region defining rods, an instruction to move the pair of filter region defining rods; and a control unit configured to control movement of the pair of filter region defining rods based on the instruction from the input unit.

In some further embodiments, the input unit may be further configured to manipulate the rod identifier representative of the pair of filter region defining rods on a whole human body optical photogram or a whole human body security inspection scanning map, thereby defining any section to be scanned of a human body to be inspected by moving the rod identifier.

In some embodiments, in the filter cage, materials and/or thicknesses of the two or more pairs of filtering sheets are determined based on different radiation filtering requirements for the radiation beam.

In some embodiments, in the filter cage, at least one pair of the two or more pairs of filtering sheets includes a pair of filtering sheets disposed around the central axis of the filter cage so as to be opposite to each other. Specifically, for example, two or more pairs of filtering sheets may include three pairs of filtering sheets, each of which includes filtering sheets disposed around the central axis of the filter cage so as to be opposite to each other.

In some embodiments, the filter cage is constructed as a squirrel cage with a gap between two adjacent filtering sheets.

In some embodiments, a rotation of the filter cage is driven by a motor. For example, the rotation of the filter cage may be driven by a stepping motor.

Preferably, the above-mentioned human body security inspection apparatus is a transmission imaging security inspection apparatus or a backscatter imaging security inspection apparatus.

According to another aspect of the present disclosure, a method of operating the above mentioned human body security inspection apparatus is provided, the method including:
  performing a scan of the human body to be inspected in a first scan mode, wherein the first scan mode refers to a mode where the two or more pairs of filtering sheets are rotated so as to adjust an outputted dosage of a radiation beam to a high-dosage for scanning, and in the first scan mode, any section to be scanned of the human body is defined by manipulating the rod identifier representative of the pair of filtering region defining rods.

Further, the method may further include: performing a scan of the human body using a second scan mode, wherein the second scan mode refers to a mode where the two or more filtering sheets are rotated so as to adjust an outputted dosage of the radiation beam to a low-dosage for scanning, and in the second scan mode, the whole human body scan is performed.

According to still another aspect of the present disclosure, there is provided a filter device for a human body security inspection apparatus, the filter device comprising: a housing and a filter cage, the filter cage being disposed within the housing and formed by arranging two or more pairs of filtering sheets, which are made of different materials and/or have different thicknesses, in an encircling way; wherein the filter cage is capable of rotating about its central axis such that at least one pair of the two or more pairs of filtering sheets is capable of filtering the radiation beam from a radiation beam exit of a radiation source of the human body security inspection apparatus to adjust an outputted dosage of the radiation beam of the human body security inspection apparatus.

In some embodiments, materials and/or thicknesses of the two or more pairs of filtering sheets are determined based on different radiation filtering requirements for the radiation beam.

In some embodiments, at least one pair of the two or more pairs of filtering sheets includes a pair of filtering sheets disposed around a central axis of the filter cage so as to be opposite to each other. Specifically, for example, the two or more pairs of filtering sheets include three pairs of filtering sheets, and each pair of filtering sheets are disposed around the central axis of the filter cage to be opposite to each other.

In some embodiments, the filter cage is configured as a squirrel cage with a gap between adjacent two filtering sheets.

In some embodiments, the rotation of the filter cage is driven by a motor. For example, the rotation of the filter cage can be driven by a stepping motor.

In some embodiments, the filter device may further include a pair of filtering region defining rods, the material and diameter of the pair of filter region defining rods being configured to be sufficient to shield and block the radiation beam emitted by the radiation source and being respectively disposed at opposite ends of the filter cage along the central axis, and the pair of filter regions defining rods being configured to be capable of moving in a direction of the central axis of the filter cage. Here, the movement of the pair of filter regions defining the rod can be driven, for example, by a stepping motor.

Other inventive objects that can be achieved by the present disclosure, as well as other technical effects that can be achieved, will be explained in the following detailed description in conjunction with the description of the specific embodiments and the accompanying drawings.

BRIEF DESCRIPTION OF THE DRAWINGS

In order to make objects, technical solutions and advantages of the present disclosure more comprehensible, the present disclosure will be further described in detail below with reference to the accompanying drawings, in which.

DETAILED DESCRIPTION

Figure 1:
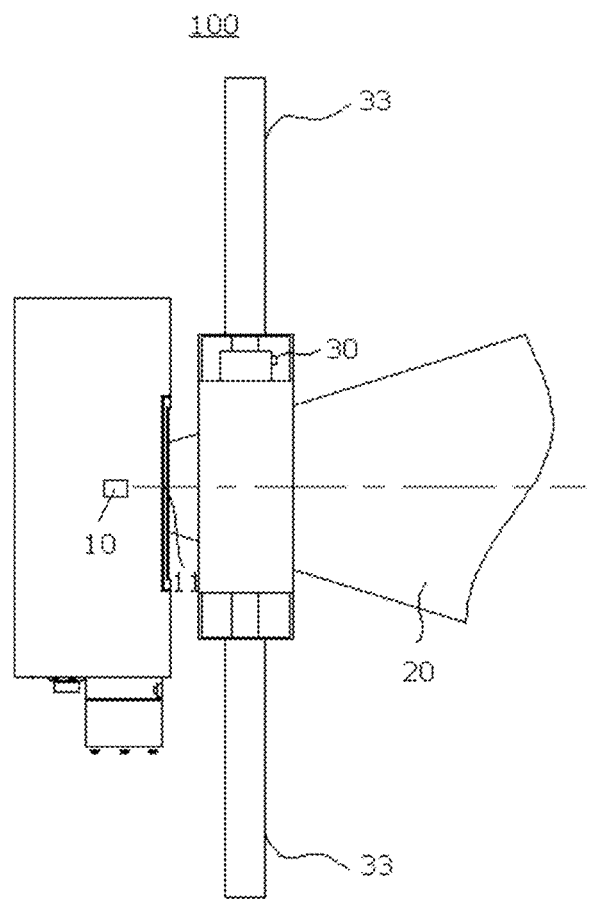
FIG. 1 is a schematic structural view of a human body security inspection apparatus according to an embodiment of the present disclosure.

The technical solutions of the present disclosure will be further specifically described below by way of embodiments and with reference to the accompanying drawings. In the description, the same or similar reference numerals indicate the same or similar parts. The description of the embodiments of the present disclosure is intended to be illustrative of the present invention, and is not to be construed as limiting According to a general inventive concept of the present disclosure, there is provided a human body security inspection apparatus including: a radiation source having a radiation beam exit and configured for emitting a radiation beam, and a beam guiding box for guiding the radiation beam emitted from the radiation source. The human body security inspection apparatus also includes a filter device disposed between the radiation beam exit of the radiation source and the beam guiding box. The filter device includes: a housing and a filter cage. The filter cage is disposed within the housing and is formed by arranging two or more pairs of filtering sheets made of different materials and/or having different thicknesses, in an encircling way; wherein the filter cage is rotatable along its central axis such that at least one pair of the two or more pairs of filtering sheets may filter the radiation beam from the radiation beam exit of the radiation source to adjust a dosage of the radiation beam outputted by the human body security inspection apparatus. There is also provided a method of operating the human body security inspection apparatus as mentioned above, the method comprising: performing a scan of a human body to be inspected using a first scan mode, wherein the first scan mode refers to a mode where two or more pairs of filtering sheets are rotated so as to adjust the dosage of the outputted radiation beam to a low-dosage for scanning, and a full body scan of the human body is performed in the first scan mode. In addition, a filter device is provided, comprising: a housing and a filter cage. The filter cage is disposed within the housing and is formed by arranging two or more pairs of filtering sheets made of different materials and/or having different thicknesses, in an encircling way; wherein the filter cage is rotatable about its central axis such that at least one pair of the two or more pairs of filtering sheets may filter a radiation beam from a radiation beam exit of a radiation source to adjust a dosage of the radiation beam outputted by the human body security inspection apparatus.

In the following detailed description, numerous specific details are set forth obviously, however, one or more embodiments may be practiced without these specific details. In other instances, well-known structures and devices are shown in the drawings schematically.

Figure 2:
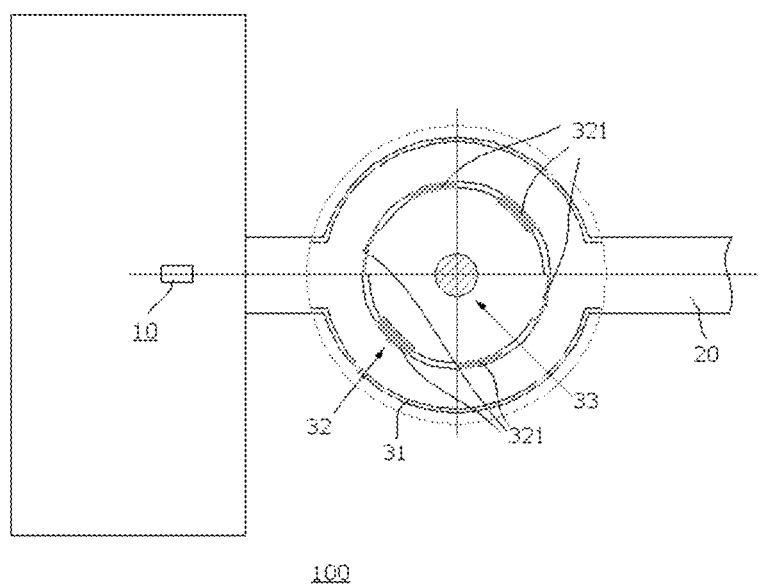
FIG. 2 is a schematic cross-sectional structural view of a human body security inspection apparatus according to an embodiment of the present disclosure.

Referring to FIGS. 1 and 2, the present disclosure provides a human body security inspection apparatus 100 that generally includes a radiation source 10, a beam guiding box 20, and a filter device 30 disposed between a radiation beam exit 11 of the radiation source 10 and the beam guiding box 20. In addition, the human body security inspection apparatus further includes essential components such as a collimator, a detector, and may also include peripheral components such as a radiation shielding plate, which will not be described herein since they are not related to the emphases of the disclosure, and may be referred to as technical contents of existing human body security inspection equipment in prior patent documents/patent application documents or in the industries when needed. According to the present disclosure, the radiation source 10 may include an X-ray source, a gamma ray source, a neutron source, or the like. In the embodiment as illustrated, the human body security inspection apparatus is an X-ray radiation human body security inspection apparatus. At this time, the radiation source 10 is an X-ray machine or an X-ray accelerator that generates X-rays for generating X-radiation beam. The beam guiding box 20 is used to suppress and absorb scattered rays on a collimator and/or a slitter to reduce the radiation protection burden on a housing of the apparatus. In the embodiment as illustrated, the beam guiding box 20 has a shape of a fan or a triangular configuration. According to the present disclosure, the filter device 30 is used for filtering the radiation beam (not shown) from the radiation beam exit 11 of the radiation source 10 to adjust the dosage of the radiation beam outputted by the human body security inspection apparatus 100. In the embodiment as illustrated, the radiation source 10 and its radiation beam exit 11, the filter device 30 and the beam guiding box 20 (and detectors and collimators not mentioned herein) are included or disposed within a same plane to achieve emitting of an X-radiation beam. Furthermore, the human body security inspection apparatus provided by the present disclosure may be a transmissive imaging security inspection apparatus or a backscatter imaging security inspection apparatus.

According to the present disclosure, as shown in FIGS. 1 and 2, the filter device 30 mainly comprises a housing 31 and a filter cage 32, the filter cage 32 is disposed within the housing 31, and the filter cage 32 is rotatable about its central axis to allow at least one pair of two or more pairs of filtering sheets to filter the radiation beam from the radiation beam exit of the radiation source so as to adjust a dosage of the radiation beam outputted by the human body security inspection apparatus. The filter cage 32 is formed by arranging two or more pairs of filtering sheets 321 made of different materials and/or having different thicknesses, in an encircling way, and at least one pair of the two or more pairs of filtering sheets 321 includes a pair of filtering sheets 321 disposed oppositely about the central axis of the filter cage 32. For the filter cage 32, the materials and/or thicknesses of the two or more pairs of filtering sheets 321 are determined based on radiation filtering properties for different radiation beams. That is, each pair of filtering sheets 321 is configured and determined based on filtering for different radiation beams, for example, a pair of filtering sheets 321 are selected for filtering radiation beam from the radiation beam exit 11 of the radiation source 10 to obtain a high-dosage outputted radiation beam, another pair of filtering sheets 321 are selected for filtering radiation beam from the radiation beam exit 11 of the radiation source 10 to obtain a low-dosage outputted radiation beam, and a further pair of filtering sheets 321 are selected for filtering radiation beam from the radiation beam exit 11 of the radiation source 10 to obtain an ultra-low-dosage outputted radiation beam, and the like. Further, the filter cage 32 is driven by a motor to rotate. For example, the filter cage 32 may be driven by a stepping motor to rotate. With this configuration, by rotating the filter cage 32, a specific pair of filtering sheets 321 in the filter cage 32 is employed to filter the radiation beam from the radiation beam exit 11 of the radiation source 10 to obtain an outputted radiation beam of the human body security inspection apparatus that has a dosage at a level as required, such as a high-dosage outputted radiation beam or an ultra-low-dosage outputted radiation beam. In the embodiment as illustrated, the filter cage 32 is configured as a squirrel cage with a gap between adjacent two filtering sheets 321. The two or more pairs of filtering sheets 321 include three pairs of filtering sheets 321, each of which is disposed around the central axis of the filter cage 32 to be opposite to each other. In this way, the human body security inspection apparatus provided by the present disclosure may achieve outputting of a radiation beam at different-level dosages and thus may achieve outputting of the radiation beam at different-level dosages under the same X-ray machine parameters, allow to obtain flexible switching of the radiation beam emitted between a high-dosage and an ultra-low-dosage in a wide range, by providing the above mentioned rotatable filter cage 32 so as to use the filtering sheets 321 made of different materials and/or having different thicknesses to filter the radiation beam from the radiation beam exit 11 of the radiation source 10 to different extents.

According to the present disclosure, as shown in FIGS. 1 and 2, the human body security inspection apparatus 100 further includes a pair of filter region defining rods 33 respectively disposed at opposite ends of the filter cage 32 in a direction in which the central axes of the filter cage 32 extends, and the pair of filter region defining rods 33 are configured to be movable in the direction in which the central axis of the filter cage 32 extend to define a filtering region of at least one pair of filtering sheets 321 of the two or more pairs of filtering sheets 321 between the pair of filter region defining rods 33. The pair of filter region defining rods 33 are designed to have material and a diameter so as to be enough to shield and block most of the radiation beam emitted by the radiation source 10 such that only the radiation beam passing through the filtering region between the pair of filter region defining rods 33 can irradiate onto a human body, thereby achieving a safe scan for any section of a human body.

Therefore, the human body security inspection apparatus 100 provided by the present disclosure may conveniently realize a safety inspection for any segment/section of a human body by providing the movable filter region defining rods.

In order to perform the human body security inspection operation of the human body security inspection apparatus 100, the human body security inspection apparatus 100 provided by the present disclosure is also provided with a corresponding operating system, including various software and hardware for performing human body security inspection operations, such as, a processing program, a scanning software, etc., and a processor, a control unit, etc. It should be noted that only the software and units related to the main content of the present disclosure are described herein, and other software and units will not be described, and if necessary, may refer to a preceding patent document(s) or patent application(s) of the applicant or in the art or technical content in the art.

According to the present disclosure, the human body security inspection apparatus 100 further includes an input unit and a control unit. The input unit is configured to transmit an instruction to move the pair of filter region defining rods in a manner of manipulating a rod identifier representative of the pair of filter region defining rods; and the control unit is configured to control movement of the pair of filtering region defining rods based on the instruction from the input unit. Additionally, the movement of the pair of filter region defining rods may be driven, for example, by a stepping motor.

Figure 3:
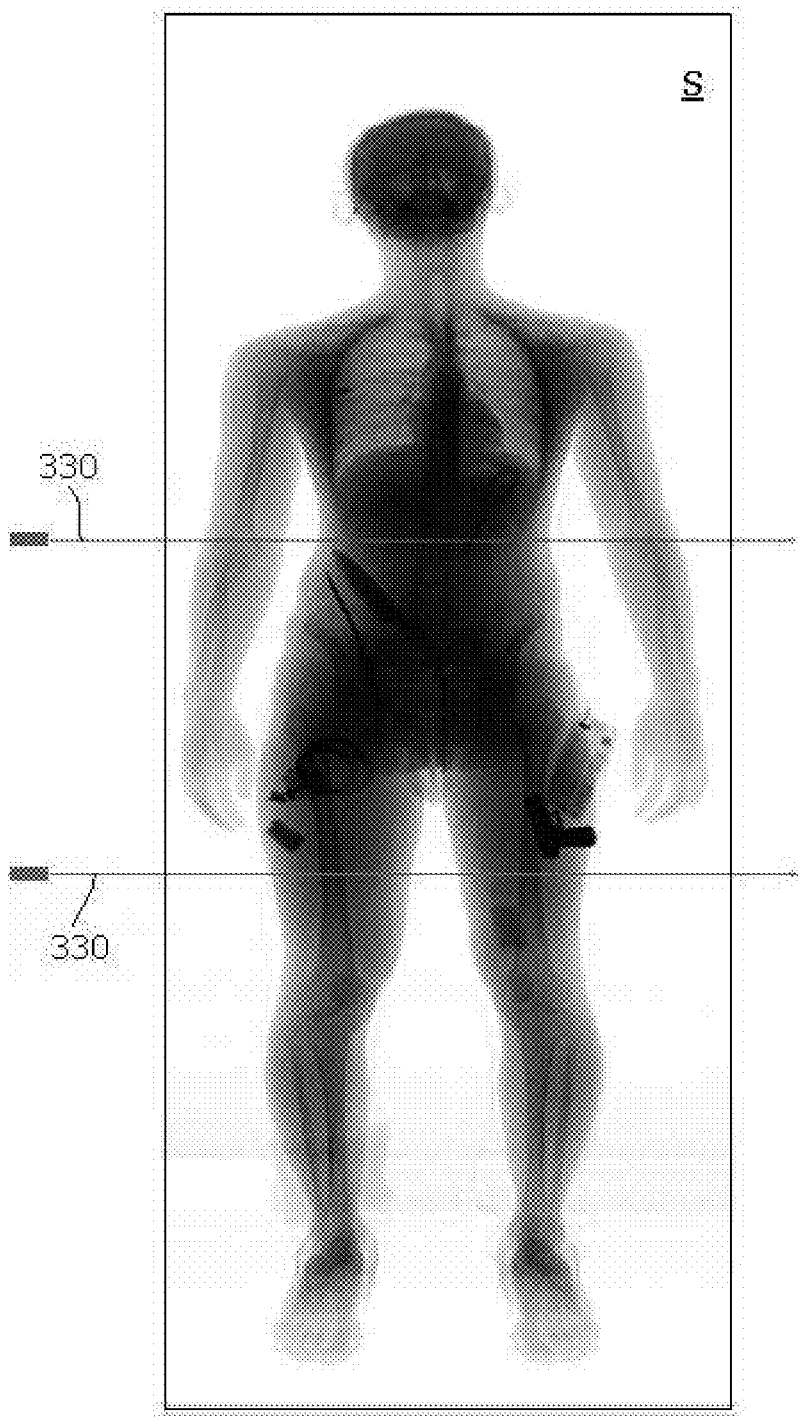
FIG. 3 is a schematic diagram of selecting any section of the human body for a high-dosage scan from a low-dosage whole human body security inspection image using a method of operating a human body security inspection apparatus according to an embodiment of the present disclosure.
Figure 4:
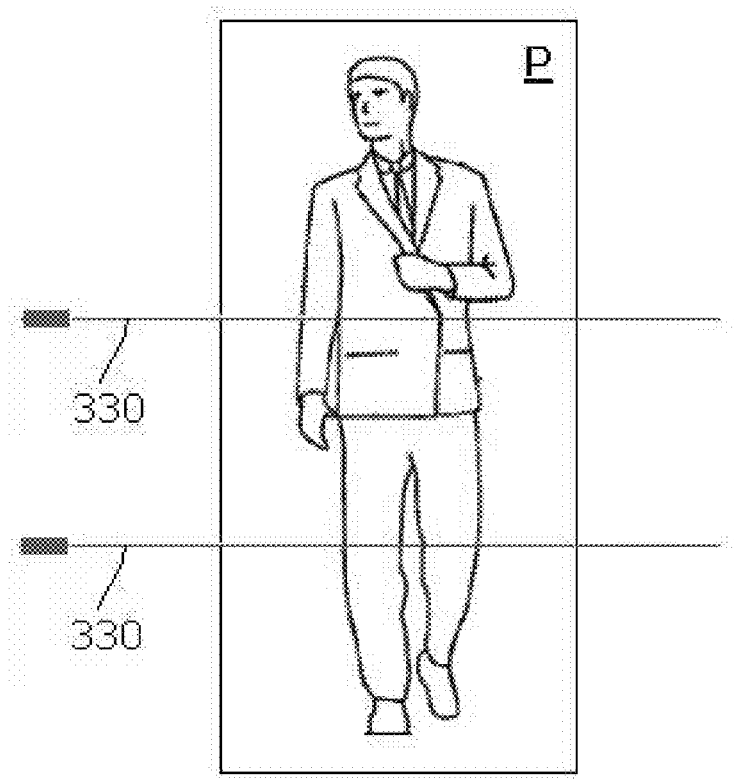
FIG. 4 is a schematic diagram of selecting any section of the human body for a high-dosage scan from a whole-body optical photogram using a method of operating a human body security inspection apparatus according to an embodiment of the present disclosure.
Figure 5:
FIG. 5 is a human body security inspection scanning map obtained after performing a high-dosage scan operation on any section of the human body for a high-dosage scan by using a method of operating a human body security inspection apparatus according to an embodiment of the present disclosure.

As shown in FIGS. 3 and 4, in the human body security inspection apparatus 100, the input unit may be configured to manipulate the rod identifiers 330 representative of the pair of filter region defining rods on a whole human body security inspection scanning map S (FIG. 3) or on a whole human body optical photogram P (FIG. 4) so as to define any scanning section of the human body to be examined by moving the rod identifier 300. For example, FIG. 3 shows a schematic diagram of selecting any section of a human body for a high-dosage scan from a low-dosage whole human body security inspection scanning map S by using the human body security inspection apparatus provided by the present disclosure, and FIG. 4 shows a schematic diagram of selecting any section of a human body for a high-dosage scan from a low-dosage whole human body security inspection optical photogram P by using the human body security inspection apparatus provided by the present disclosure. Correspondingly, the control unit is configured, based on the instruction from the input unit, to control the movement of the pair of filter region defining rods to define a filter region between the pair of filter region defining rods, thereby defining a scan range for the radiation beam. For example, FIG. 5 shows a human body security inspection scanning map obtained by performing a high-dosage scan on any section, which is selected for a high-dosage scan, of a human body by using the human body security inspection apparatus provided by the present disclosure.

It can be seen that, according to the human body security inspection apparatus provided by the present disclosure, a physical location of the pair of filter region defining rods is associated with the apparatus scanning software, so that when performing the human body security inspection, a whole body scan of an ultra-micro dosage or a specific location optical imaging is performed in advance on a person to be inspected and the whole human body security inspection scanning map or whole human body optical photogram obtained is displayed in the software interface, so as to click and drag the rod identifiers, representative of the filter region defining rods, on the software interface to adjust an actual physical position of the filter region defining rods that is driven electrically, and then a scan inspection may be performed on the person, that is, a precise and local scan may be performed on any section or location of the human body of a suspicious person. In this way, a scan security inspection may be performed flexibly on any section of the human body.

Accordingly, the present disclosure further provides a method of operating the aforementioned human body security inspection apparatus. The method includes: performing a scan of a human body to be inspected in a first scan mode, wherein the first scan mode refers to a mode where the two or more pairs of filtering sheets are rotated so as to adjust an outputted dosage of a radiation beam to a high dosage for scanning, and in the first scan mode, any section of the human body to be scanned is defined by manipulating the rod identifiers representative of the pair of filtering region defining rods. The method further includes: performing a scan of the human body in a second scan mode, wherein the second scan mode refers to a mode where the two or more pairs of filtering sheets are rotated so as to adjust an outputted dosage of a radiation beam to a low dosage for scanning, and in the second scan mode, the whole human body is scanned.

Therefore, the human body security inspection apparatus and the method of operating the same provided by the present disclosure may adopt the following software design flow.

a). When the human body is ready to enter a scanning passage, firstly a dosage level of the radiation beam outputted for security inspection scan is determined based on the relevant information.

b). Based on the determined dosage level of the radiation beam outputted, a stepping motor that controls the filter device is started, rotating the filter cage to select a corresponding pair of filtering sheets for filtering such that the radiation beam coming from the radiation source and passing through the pair of filtering sheets is filtered to a desired dosage level for outputting.

c). A common whole body security inspection scan is performed at the desired dosage level on the human body.

d). After the corresponding filter is selected, if it is needed to perform a security inspection scan on a local section of the human body, or if a specific local section of the human body is needed to be re-scanned or to be scanned at an increased dosage since uncertainty exists on inspection on the local section or the image is not definite after a common whole human body inspection scan of the human body, the rod identifiers representative of the filter region defining rods on the software interface may be clicked and dragged so as to move the filter region defining rods to define a specific location for scanning, thereby achieving a local security inspection scan of any section of the human body.

e). If a security inspection scan needs to be performed at a precise location of the specific segment of the human body, then after selecting the corresponding filtering sheets, the rod identifiers representative of the filter region defining rods on the software interface may be clicked and dragged, by reference to the common low-dosage whole human body security inspection scanning map or a specific location of the whole human body optical photogram, so as to move the filter region defining rods to define a local scan region, thereby realizing a precise local security inspection scan of any segment of the human body.

It can be seen that, according to the human body security inspection apparatus and the method of operating the same provided by the present disclosure, due to configuration of the filter device at a junction of the radiation source and the beam guiding box, the radiation beam may be selectively passed through the filtering sheets having different filtering properties so as to allow the human body security inspection apparatus to output a radiation beam at a dosage in a wide range, thereby meeting requirements of security inspection in different situations, locations, times, and populations. Moreover, according to the human body security inspection apparatus and the method of operating the same provided by the present disclosure, due to provision of the movable filter region defining rods at both ends to the filter cage and due to movement and adjustment of the physical positions of the filter region defining rods, the security inspection scan of any section of the inspected human body may be realized. In addition, according to the human body security inspection apparatus and the method of operating the same provided by the present disclosure, the physical positions of the pair of filter region defining rods are associated with the apparatus scanning software, so that the rod identifiers representative of the filter region defining rods are displayed on the software interface and adjustment of the actual physical positions of the pair of filter region defining rods is allowed by clicking and dragging the rod identifiers on the software interface so as to define a local scan region, thereby achieving flexible, rapid and convenient adjustment of security inspection scan for any section of the human body. Moreover, the foregoing movement of the filter region defining rods may be achieved by dragging the rod identifiers on the specific location of the optical photogram or the common low-dosage security inspection scanning map (the image is displayed on the software interface), thereby defining the actual physical position of the filter region defining rods and realizing the local precise scan inspection of any section of the human body.

Further, the present disclosure also provides a filter device for a human body security inspection apparatus. As shown in FIGS. 1 and 2, the filter device 30 includes: a housing 31, and a filter cage 32 disposed within the housing 31 and formed by arranging two or more pairs of filtering sheets 321, which are made of different materials and/or have different thicknesses, in an encircling way; wherein the filter cage 32 is rotatable along its central axis such that at least one pair of the two or more pairs of filtering sheets 321 may filter a radiation beam from a radiation beam exit of a radiation source of the human security inspection apparatus to adjust an outputting dosage of the radiation beam of the human body security inspection apparatus. The materials and/or thicknesses of the two or more pairs of filtering sheets 321 are determined based on the different radiation filtering requirements for the radiation beam. At least one pair of the two or more pairs of filtering sheets 321 includes a pair of filtering sheets 321 disposed around the central axis of the filter cage 32 so as to be opposite to each other. For example, two or more pairs of filtering sheets 321 may include three pairs of filtering sheets 321, each pair of filtering sheets 321 being disposed about the central axis of the filter cage 32 so as to be opposite to each other. The filter cage 32 is constructed in a squirrel cage shape with a gap between two adjacent filtering sheets 321. The rotation of the filter cage 32 is driven by a motor. For example, the rotation of the filter cage may be driven by a stepping motor. The filter device 30 may further include a pair of filter region defining rods 33 that are configured to have a material and diameter sufficient to shield and block the radiation beam emitted by the radiation source. The pair of filtering regions defining rods 33 are separately disposed at opposite ends along the central axis of the filter cage, and the pair of filter region defining rods 33 are configured to be movable in a direction in which the central axis of the filter cage extends. Here, the movement of the pair of filter region defining rods 33 may be driven, for example, by a stepping motor. For a detailed description and description of the above-described filter device for a human body security inspection apparatus, reference may be made to the foregoing description and description of the human body security inspection apparatus, which will not be repeatedly described herein.

It can be seen from the above that, according to the human body security inspection apparatus and the method of operating the same and the filter device for the human body security inspection apparatus provided by the present disclosure, two or more pairs of filtering sheets made of different materials and/or having different thicknesses are provided in the rotatable filter cage to achieve flexible switching of the radiation beam emitted by the human body security inspection apparatus between a high-dosage and an ultra-low-dosage in a wide dosage range. Further, a pair of movable filter region defining rods is provided at both ends of the filter cage to define a filtering region to define a scanning range for the radiation beam, thereby ensuring convenient safety inspection of any segment of the human body while reducing unnecessary radiation damage to other parts of the body.

Purposes, technical schemes and advantageous effects of the present disclosure have been described in detail with reference to the above specific embodiments. It shall be understood that the contents described above only refer to exemplary embodiments of the present disclosure and are not intended to limit the present disclosure. Any modifications, equivalent substitutions, improvements, etc., made within the spirit and scope of the present disclosure, are intended to be included within the scope of the present disclosure.

The invention claimed is:

1. A human body security inspection apparatus comprising:
   a radiation beam exit configured to emit a radiation beam; and
   a beam guiding box configured to guide the radiation beam emitted from the radiation beam exit;
   a filter device disposed between the radiation beam exit and the beam guiding box, the filter device comprising:
      a housing; and
      a filter cage, having a central axis, disposed within the housing and formed by arranging two or more pairs of filtering sheets, which are made of different materials and/or have different thicknesses, in an encircling way,
      wherein the filter cage is rotatable about its central axis such that at least one pair of the two or more pairs of filtering sheets is capable of filtering the radiation beam from the radiation beam exit to adjust an outputted dosage of the radiation beam of the human body security inspection apparatus; and
   a pair of filter region defining rods, the filter region defining rods of the pair being respectively disposed at opposite ends of the filter cage along the central axis of the filter cage and one or more filter region defining rods of the pair of filter region defining rods configured to be movable in a direction to define a filter region between the pair of filter region defining rods for the at least one pair of the two or more pairs of filtering sheets so as to define a scan range of the radiation beam.

2. The human body security inspection apparatus as claimed in claim 1, wherein a material and a diameter of the pair of filter region defining rods are configured to be sufficient to shield and block the radiation beam emitted by the radiation beam exit.

3. The human body security inspection apparatus as claimed in claim 1, further comprising:
   an input unit configured to transmit, responsive to manipulation of a rod identifier representative of the pair of filter region defining rods, an instruction to move the one or more filter region defining rods of the pair; and
   a control unit configured to control movement of the one or more filter region defining rods of the pair based on the instruction from the input unit.

4. The human body security inspection apparatus as claimed in claim 3, wherein:
   the input unit is further configured to manipulate the rod identifier representative of the pair of filter region defining rods on a whole human body optical photogram or a whole human body security inspection scanning map, so as to define any section for scanning of a human body to be inspected by moving the rod identifier.

5. A method of operating a human body security inspection apparatus as claimed in claim 3, the method comprising:
   performing a scan of a human body to be inspected in a first scan mode, wherein the first scan mode refers to a mode where the two or more pairs of filtering sheets are rotated so as to adjust an outputted dosage of a radiation beam to a high-dosage for scanning, and in the first scan mode, any section to be scanned of the human body is defined by manipulating the rod identifier representative of the pair of filtering region defining rods.

6. The method as claimed in claim 5, further comprising:
   performing a scan of the human body using a second scan mode, wherein the second scan mode refers to a mode where the two or more filtering sheets are rotated so as to adjust an outputted dosage of the radiation beam to a low-dosage for scanning, and in the second scan mode, the whole human body scan is performed.

7. The human body security inspection apparatus as claimed in claim 1, wherein, in the filter cage, the materials and/or thicknesses of the two or more pairs of filtering sheets are determined based on different radiation filtering requirements for the radiation beam.

8. The human body security inspection apparatus as claimed in claim 1, wherein, in the filter cage, at least one pair of the two or more pairs of filtering sheets includes a pair of filtering sheets disposed around the central axis of the filter cage so as to be opposite to each other.

9. The human body security inspection apparatus as claimed in claim 8, wherein the two or more pairs of filtering sheets include three pairs of filtering sheets, each of which includes filtering sheets disposed around the central axis of the filter cage so as to be opposite to each other.

10. The human body security inspection apparatus as claimed in claim 1, wherein the filter cage is constructed as a squirrel cage with a gap between two adjacent filtering sheets.

11. The human body security inspection apparatus as claimed in claim 1, wherein a rotation of the filter cage is driven by a motor.

12. The human body security inspection apparatus as claimed in claim 1, wherein the human body security inspection apparatus is a transmission imaging security inspection apparatus or a backscatter imaging security inspection apparatus.

13. A filter device for a human body security inspection apparatus, the filter device comprising:
   a housing; and
   a filter cage, having a central axis, disposed within the housing and formed by arranging two or more pairs of filtering sheets, which are made of different materials and/or have different thicknesses, in an encircling way,
      wherein the filter cage is rotatable about its central axis such that at least one pair of the two or more pairs of filtering sheets is capable of filtering a radiation beam from a radiation beam exit of a radiation source of the human body security inspection apparatus to adjust an outputted dosage of the radiation beam of the human body security inspection apparatus; and
   a pair of filter region defining rods, the filter region defining rods of the pair respectively disposed at opposite ends of the filter cage along the central axis and one or more filter region defining rods of the pair configured to be movable in a direction in which the central axis of the filter cage extends.

14. The filter device as claimed in claim 13, wherein the materials and/or thicknesses of the two or more pairs of filtering sheets are determined based on different radiation filtering requirements for the radiation beam.

15. The filter device as claimed in claim 13, wherein at least one pair of the two or more pairs of filtering sheets includes a pair of filtering sheets disposed around the central axis of the filter cage so as to be opposite to each other.

16. The filter device as claimed in claim 15, wherein the two or more pairs of filtering sheets include three pairs of filtering sheets, each of which includes filtering sheets disposed around the central axis of the filter cage so as to be opposite to each other.

17. The filter device as claimed in claim 13, wherein the filter cage is constructed as a squirrel cage with a gap between two adjacent filtering sheets.

18. The filter device as claimed in claim 13, wherein the rotation of the filter cage is driven by a motor.

19. The filter device as claimed in claim 13, wherein the filter region defining rods have a material and a diameter configured to be sufficient to shield and block the radiation beam emitted by the radiation beam exit.

20. A control system filter for the filter device as claimed in claim 13, the control system comprising:
- an input unit configured to transmit, responsive to manipulation on a display of a rod identifier representative of the pair of filter region defining rods, an instruction to move one or more of the filter region defining rods of the pair; and
- a control unit configured to control movement of the one or more of the filter region defining rods of the pair based on the instruction from the input unit.

* * * * *